Feb. 27, 1923.
J. D. LACROIX
1,446,755
TIRE FORMING MACHINE
Filed Apr. 16, 1921
6 sheets-sheet 1
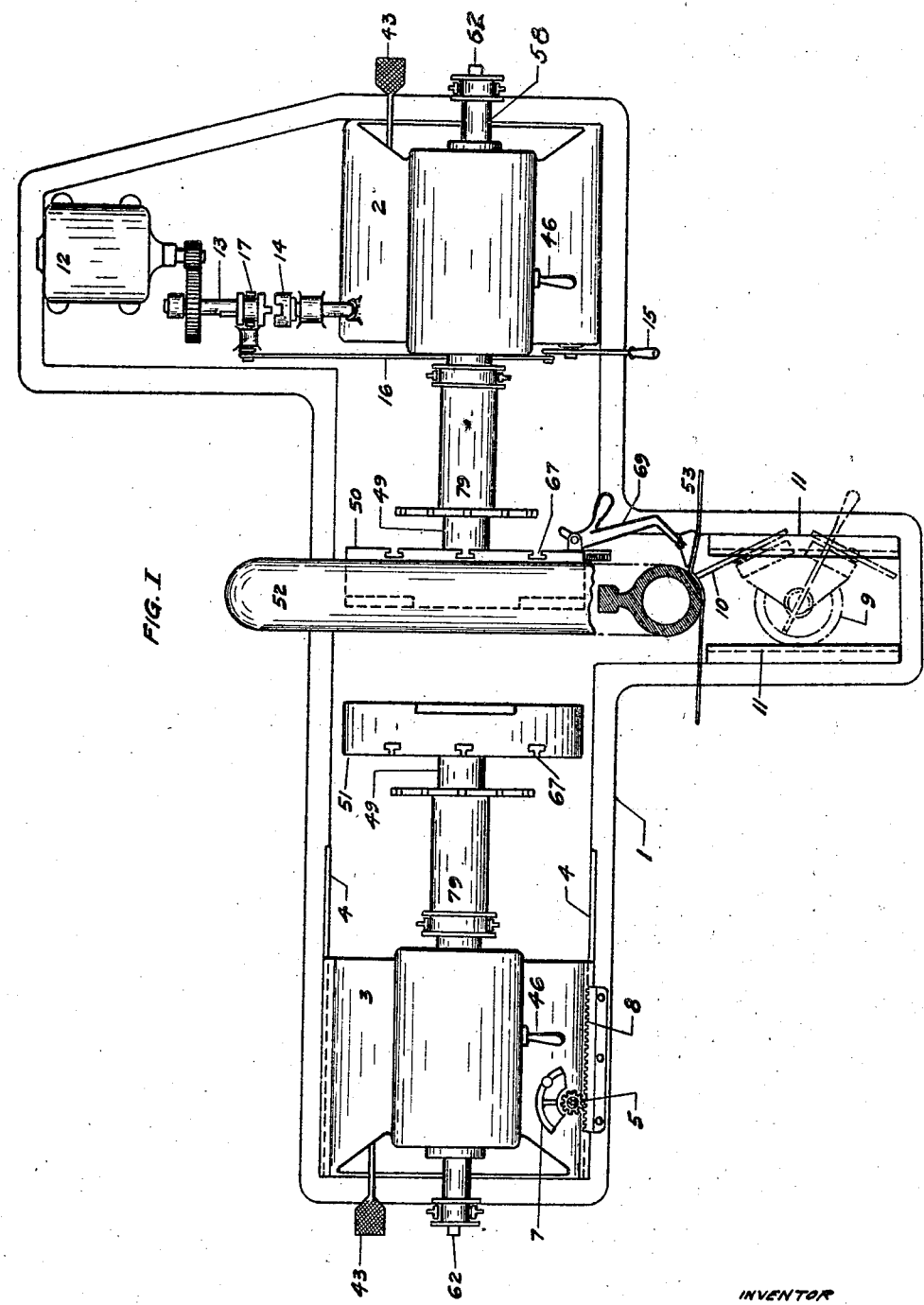
INVENTOR
JOSEPH D. LACROIX
BY:
R H Waters
ATTORNEY.

Feb. 27, 1923.
J. D. LACROIX
1,446,755
TIRE FORMING MACHINE
Filed Apr. 16, 1921
6 sheets-sheet 2
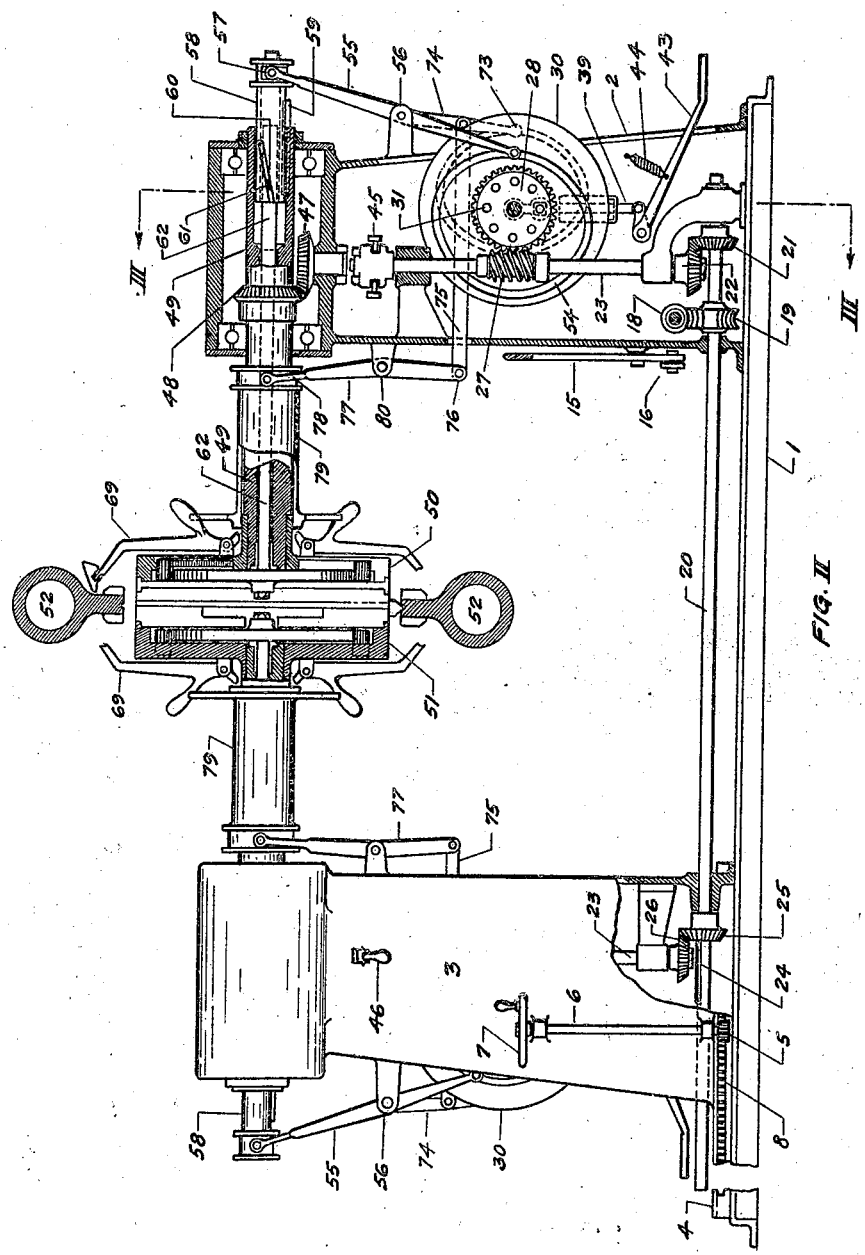
INVENTOR
JOSEPH D. LACROIX
BY:
R H Waters
ATTORNEY.

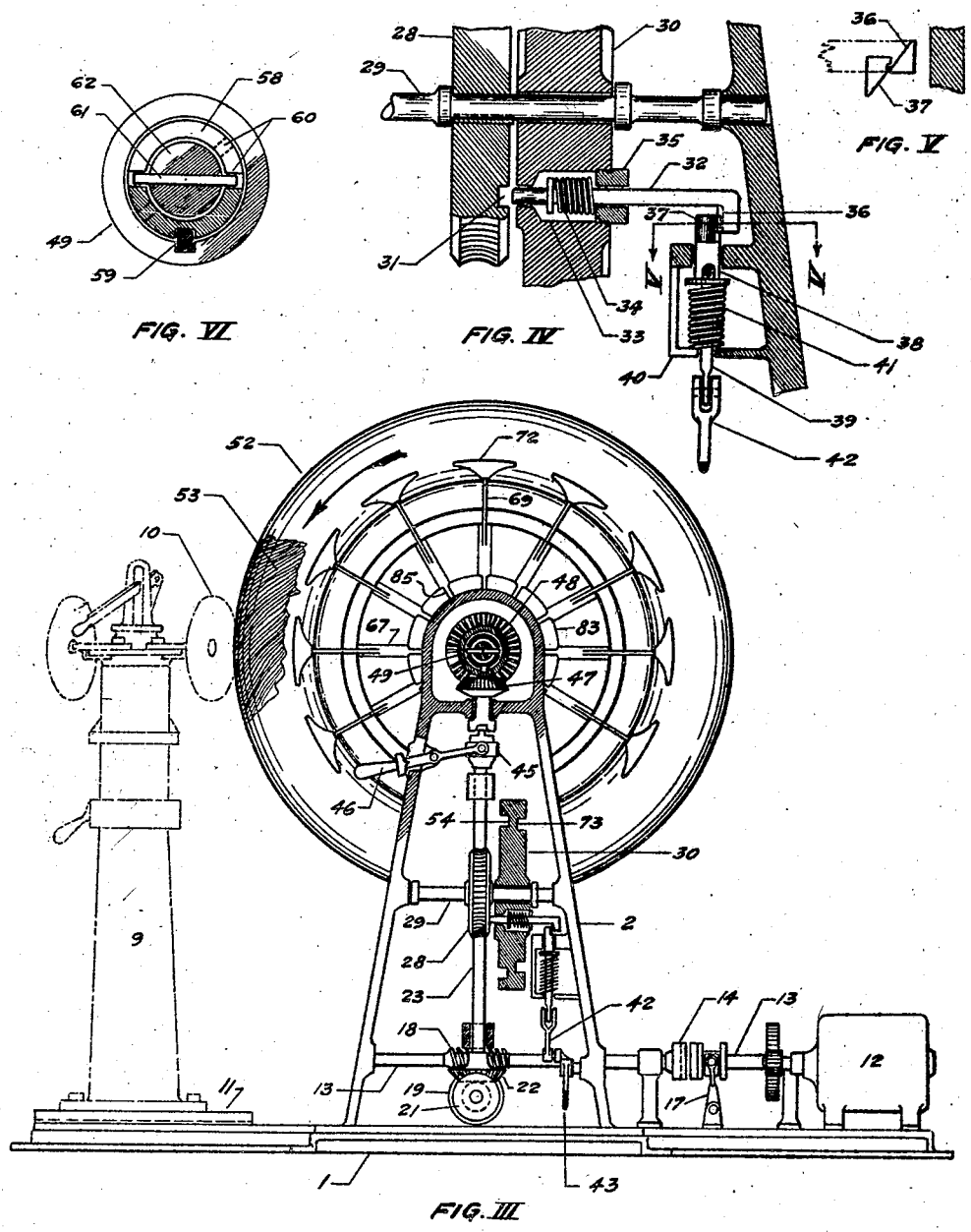

Feb. 27, 1923.
J. D. LACROIX
1,446,755
TIRE FORMING MACHINE
Filed Apr. 16, 1921
6 sheets-sheet 4
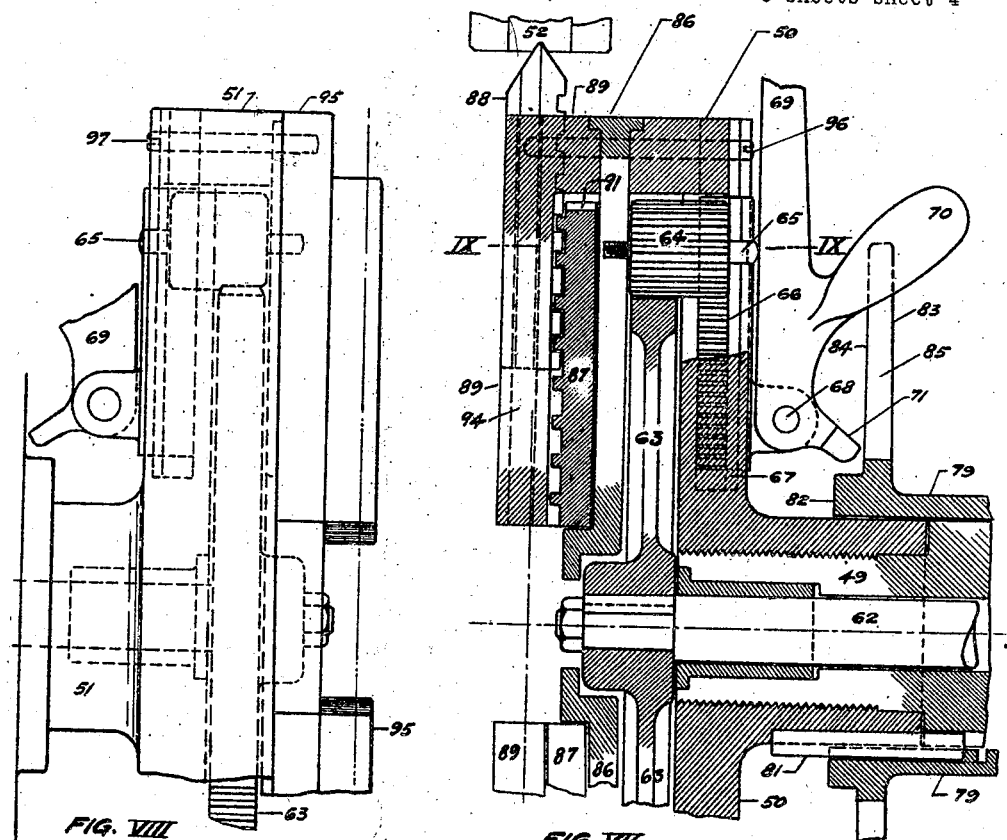
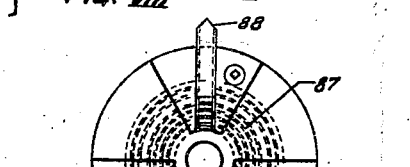
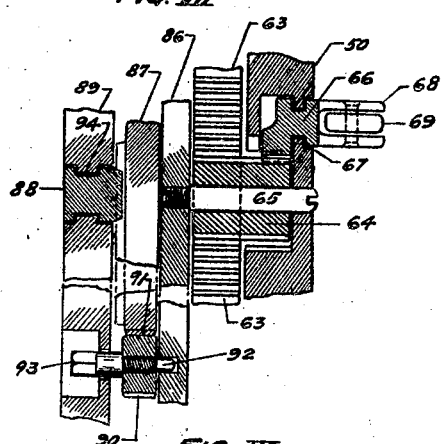
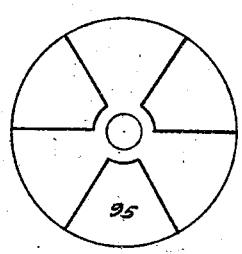
INVENTOR
JOSEPH D. LACROIX
BY:
R.H.Waters.
ATTORNEY.

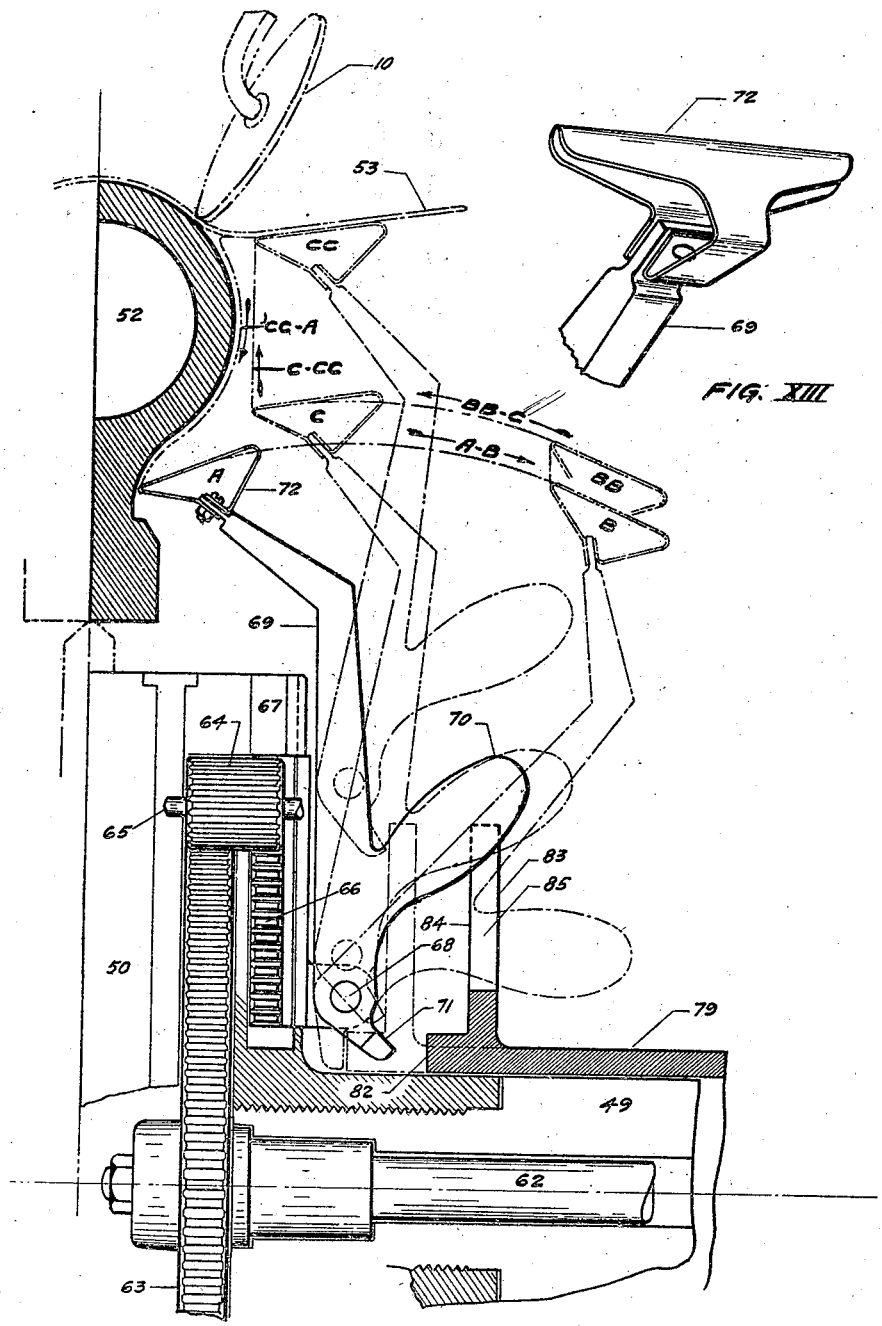

Feb. 27, 1923.
J. D. LACROIX
1,446,755
TIRE FORMING MACHINE
Filed Apr. 16, 1921      6 sheets-sheet 6
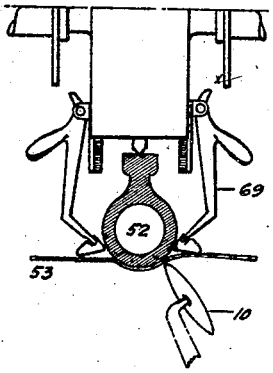
FIG. XIV
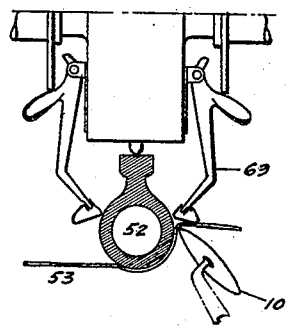
FIG. XV
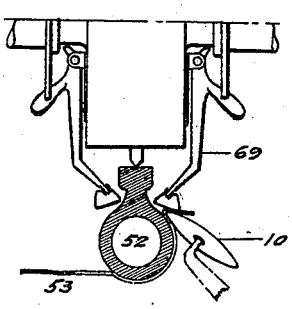
FIG. XVI
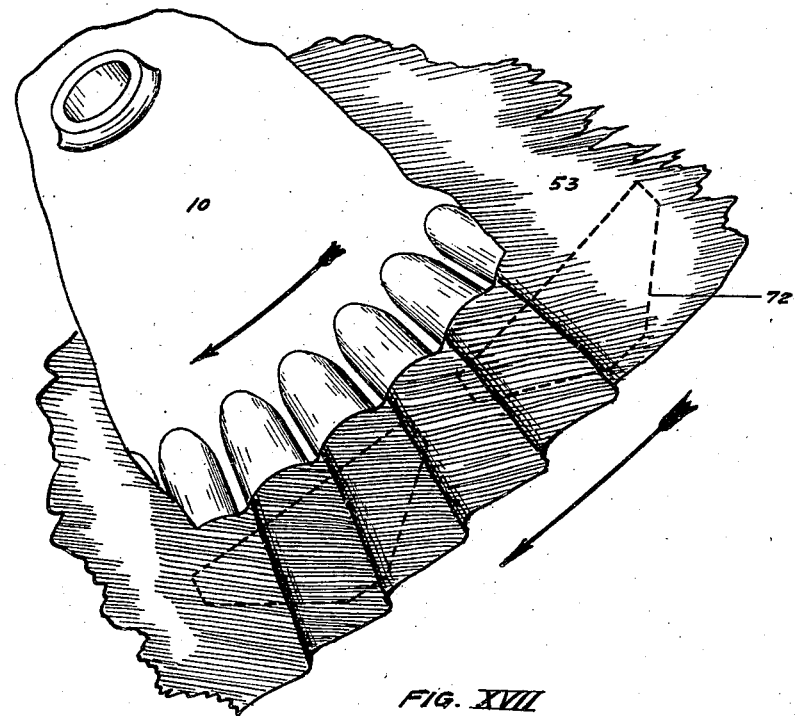
FIG. XVII
INVENTOR
JOSEPH D. LACROIX
BY:- R.H.Waters
ATTORNEY.

Patented Feb. 27, 1923.

1,446,755

UNITED STATES PATENT OFFICE.

JOSEPH D. LACROIX, OF NEW ORLEANS, LOUISIANA, ASSIGNOR TO KELLY-SPRINGFIELD TIRE COMPANY, A CORPORATION OF NEW JERSEY.

TIRE-FORMING MACHINE.

Application filed April 16, 1921. Serial No. 461,997.

*To all whom it may concern:*

Be it known that I, JOSEPH D. LACROIX, a citizen of the United States of America, residing at New Orleans, La., in the parish of Orleans and State of Louisiana, have invented certain new and useful Improvements in a Tire-Forming Machine, of which the following is a specification.

This invention relates to machines known in the tire building art. to which it pertains, as tire carcass forming machines—particularly to that type of machine characterized by a revoluble core upon which the fabric structure is formed in successive plys and having juxtaposed thereto a device, known as a stitcher, the function of which is to roll, or compress, the fabric in conformity with the contour of the core.

The universal method of constructing the fabric carcass is to apply the fabric, ply by ply, upon the core, each complete ply being independently laid by stitching prior to stretching the succeeding strip thereon. These fabric plys are coated with an exceedingly sticky rubber compound which renders them difficult of handling and liable to adhere with great tenacity to any surface with which they contact. This property of adhesion requires that the process of laying the strips upon the core, or upon the last preceding ply, be performed with considerable skill and precision, without which the fabric is apt to inadvertently come into contact with a portion of the core other than in the immediate path of the stitching disc and adhere thereto in a manner conducive to the formation of buckles, or creases; a condition requiring that the defective ply be removed, or indeed, that the entire structure be condemned. One of the objects of this invention is to provide against the possibility of the unapplied fabric contacting prematurely or improperly with the core, or a preceding layer, by the introduction of radially movable fabric supporting members which effectively shield the underlying surface and yet retreat radially inwardly at a predetermined rate as the stitcher disc follows gradually downwardly of the core from the median plane to the bead ring, or inner or selvage edge.

In the well known operation of stitching, the disc must effect a compression of the skirts, or flying edge, of the fabric ply as it is gradually laid against the core during the progress of the stitching radially inwardly of the core. During this operation the stitcher disc wheel is caused to assume an angle with respect of the normal face of the core tending to set up a "wiping" or sliding action between disc and fabric at their point of contact. As this operation progresses the stitcher disc may feed radially inwardly at too great a speed to properly lay the fabric; buckles may be formed due to the absence of any means of shielding the unapplied portions of the fabric from the core. The provision of fabric support arms, in my invention, will automatically safe-guard against damage due to excessive feed on the stitcher for the reason that the rate of radial withdrawal of the supports is a predetermined function of the rate of revolution of the revoluble core; that is, it may be determined in the related gearing that the support arms shall retract one-eighth of an inch to each complete revolution of the core, or any desired linear degree. By my device it will be observed that the rate of retraction of the arms will serve as a guide to the operator in his control of the stitcher feed and thus require that each ply be uniformly laid.

In the construction of carcasses of the " cord type " the plys are cut on the bias, so that, as applied on the core, the strands cross the circumference in arcuate paths—this characteristic being illustrated in Fig. III and Fig. XVII of the accompanying drawings. Succeeding plys are added so that the direction of the strands, in bias, is reversed with respect of the underlying ply. In the stitching of these cord plys experience has demonstrated the desirability of causing the stitcher to be applied in the direction of the cords, rather than against them, as by so doing the probability of separating the loosely-woven strands is reduced to the minimum. Pursuant of this practice of stitching only in the direction of the cords it will be observed that but one side of the core should be stitched down while rotation is in the direction favorable thereto; it being desirable to reverse the direction of rotation of the core when shifting the stitcher to the opposite side to lay the other half of the ply. Fig. III shows the direction of rotation of the core to lay the cord shown in fragmental view; it being obvious that the direction of rotation therein indicated by the arrow would be reversed during the stitching of the unapplied half of the fabric upon the opposite side of the core. My invention is particularly adapted for forming cord tires, as facility for reversing the core has been provided in the mechanical control forming a part of the invention, and for the further reason that the fabric support arms are especially effective in assisting in the manipulation of cord fabric.

It has been proved by experience that the compression of the cord fabric radially inwardly of the core by spinning or stitching is more difficult than the same operation on cross-woven fabric, and my invention has particularly sought to overcome the difficulties heretofore unsolved by machines of the prevailing type. Among the elements contributing to the success of my present machine is the particular design of the stitcher disc, particularly shown in Fig. XVII, and specifically claimed in a co-pending application Serial No. 470,681, filed May 18th, 1921; it being deemed sufficient for the purpose of illustrating the advantages of my fabric support arms to call attention to the saw-tooth edge and fluted portions therebetween and to note that there is a related and beneficial function between the means for, and method, of supporting the unapplied fabric and the form of the contacting periphery of the stitcher disc. It is noted that the periphery of the stitcher disc, when normally and properly associated with the retreating fabric supports tends to run a well-defined circumferential crease in the fabric, see Fig. XV and Fig. XVI. The effect of this relation of parts is that the saw-toothed and fluted disc advances by a small, but well-defined, step-by-step contact with the fabric formed within the above mentioned crease or angle. The resulting consequence to the fabric, being thus prevented from straightening out under centrifugal action by the disc contact, is that it tends to fold or crease between the teeth of the disc, as may be readily appreciated. The creasing, or crimping of the fabric in regular and uniform waves is most beneficial, as by this formation uniform compression of the fabric is attained as the unapplied skirts are gradually stitched down. These creases or waves, shown greatly exaggerated and enlarged in Fig. XVII, are flattened out by the disc successively passing over them. A smooth-edged stitcher disc is liable to crowd or "scuff-up" the fabric ahead of it in the compression operation, thus causing separation of the cords, or buckling.

With these and other objects in view, the invention consists in the novel construction and arrangement of parts hereinafter described, delineated in the drawings and specifically claimed, it being understood that, although I have particularly indicated the application of this machine to the construction of "cord type" carcasses by an effective method, the device is adapted to operate on any kind of a carcass, and that changes for these other purposes may be made without departing from the scope of the invention.

The following description will be better understood with the explanation that the machine comprises two practically similar and independently controlled halves. The right hand mounting, with its component parts and gearing, including the chuck element, being similar, except as otherwise indicated, to the left hand side. The left hand mounting is slidably removable from the right, separation being from the clutch faces of the chuck. The gearing of the left side as hereafter explained, is arranged to revolve the core in an opposite direction to that produced by the gearing within the right hand side without reversing the main power source. A clutch is interposed on both right and left elements in the vertical shafting within the housings; one of them habitually being out while the other is in, thus providing for reversal of the core at the will of the operator. The fabric arm reciprocating gear is controlled independently on each housing, it being noted that either right or left hand arms may be operated irrespective of the position of the power drive clutches on the aforementioned vertical shafts within the housings. In the stitching of cord fabric it is advantageous to operate completely on one half of the core at one time, thus only requiring that the fabric support arms function on the side being stitched; the opposite side being thereafter laid when the core revolution is reversed and the adjacent fabric supports then utilized. Should it be desired to stitch both sides of the core simultaneously by independent stitcher discs it is possible to cause both sets of fabric arms to function simultaneously, as these elements are driven in coacting relation by a common power source in constant operable relation to each; it being only necessary to clutch their respective operating cams into gear with the respective worm wheels within each of the housings. The worm wheels being on parts of the respective core driving shafts not affected by the clutches for selectively driving the core in different directions.

Similar numerals of reference are used to denote corresponding parts in the accompanying drawings, which merely show a preferred form and a practical embodiment of the invention, it being noted that the invention is susceptible of a wide range of variation in means for utilizing it without departing from the principles thereof.

In these drawings:

Fig. I is a general plan view of the entire machine; a portion of the core being shown in section adjacent the stitching device; also a ply of fabric is shown as just applied, the core being assumed in rotation, throwing the skirts of the fabric centrifugally outward, and the fabric arm shown at its outer travel at the moment of applying the stitcher disc. This view shows the housings separated for the purpose of removing or mounting the core; it being noted that the fabric support arms have not been indicated on the left hand chuck, also that but one such arm is illustrated on the right hand chuck. In operation the chucks are together and clutched in nonrotatable relation. It is noted that the machine may be successfully operated with only the right hand side in use, that is, with the left housing drawn away. In this condition the cord or fabric may be laid on the side of the core adjacent the drive. The core can then be removed from the chuck, turned about and remounted with the unapplied fabric exposed to the stitcher disc and that side laid as was the first.

Fig. II is a front elevation, partially in section, with the chucks clutched in normal operable position. The mechanism within the respective housings being similar except as otherwise noted; that delineated for the right hand element is particularly shown. It is noted that the transmission gear in the left hand housing for taking motion from the splined drive shaft from the right side is different as shown within the broken-away view; this difference in gearing is for the purpose of providing a different direction of rotation of the respective core driving means within the two housings, one of such independent drives being always out of clutch. The left hand housing, being the movable one, means are shown thereon for effecting its slidable relation with respect of the right hand element.

Fig. III is a sectional view through right hand housing on the line III—III of Fig. II. In this view is shown the core with its fabric support arms partially retracted and a fragmental section of "cord fabric" on the core adjacent the stitching disc. The cam wheel that actuates the fabric arms is illustrated in gear with the worm wheel.

Fig. IV is an enlarged fragmental view of the cam wheel showing its clutch bolt for engaging it with the constantly revolving worm wheel and the automatic stop device for controlling it. The bolt is in the "off" position, thus illustrating the cam idle. This view applies to either housing.

Fig. V is a section through the plane V—V of Fig. IV showing the cross section of the automatic bolt stop and release.

Fig. VI is an enlarged section through the head of either housing showing the reciprocating tubular cam, slidably but non-rotatably splined to the core driving shaft; also the oscillating fabric arm manipulating spindle, keyed in the spiral cam slot of the tubular cam.

Fig. VII is a sectional elevation of the right hand chuck showing the gear for reciprocating the fabric support arms when the spindle is oscillated within the spiral cam: Also the gear for chucking the core.

Fig. VIII is an elevation of the left hand chuck illustrating the clutch face adapted to engage the complementary register on the right hand chuck. It being remarked that the gearing for imparting reciprocatory motion to the fabric support arms is similar to that of the right hand chuck.

Fig. IX is a partial section through the plane IX—IX of Fig. VII showing the relation of the internal gearing within the right hand chuck. It being noted that so much of the gear as is applicable to actuating the fabric support arms is also common to the left hand chuck.

Fig. X is a face view, on a small scale, of the right hand chuck, showing the clutch; also the self-contained gearing for chucking the core.

Fig. XI is a face view, on a small scale, of the left hand chuck showing the clutch.

Fig. XII is an elaboration of Fig. VII showing, partially in diagram, the behavior of the fabric support arms during one complete cycle of stitching—or the result of one full revolution of the cam wheel between its manual release and automatic stop. This view applies also to the left hand chuck and is hereafter more fully explained.

Fig. XIII shows a preferred form of fabric support palm.

Fig. XIV shows a half section of the core and chuck, with a ply of fabric stretched, and the fabric support all the way out at the moment that the stitcher disc is applied.

Fig. XV is a further operation on the fabric ply as it is being stitched down; the disc is shown following the retreating arms radially downward of the core.

Fig. XVI is a further operation on the fabric ply, the operation being nearly complete.

Fig. XVII is an enlarged view of the saw-toothed and fluted stitcher disc, showing the crimping effect on the fabric as it is compressed and supported by the palms of the fabric arms. The degree of crimping being exaggerated.

Referring specifically to the drawings the preferred form of the invention will be described:—

*Base and main drive gear.*—This device comprises a bed plate 1, having a right hand stationary housing 2 thereon; a left hand axially slidable housing 3, slidable within a track 4, and actuated therein by a pinion 5 on a shaft 6 having a hand wheel 7, all journaled on the housing 3, the pinion 5 engages a rack 8 on the bed plate 1. On the bed plate is a stitcher device 9 having a disc 10, the element being slidable on a track 11 on the bed plate. See Figs. I, II and III.

The power mechanism comprises a source of power 12, suitably geared to drive a shaft 13 having a clutch 14 therein. Shaft 13 enters housing 2 within which it is journaled. Clutch 14 is controlled by a lever 15 on housing 2 operating through a link 16 to actuate a suitable shifter 17. See Figs. I, II and III.

Power transmission to the core revolving chucks is from shaft 13 which has, within the housing 2, a worm 18 keyed thereon and engaging a worm wheel 19 keyed to a counter shaft 20 which extends between, and is journaled within, housings 2 and 3. Within housing 2 and keyed to 20 is a bevel gear 21, in turn meshing with a similar gear 22 keyed to a vertical shaft 23. The left hand end of shaft 20 is slidably journaled within housing 3 and has a splined portion 24 upon which is non-rotatably but slidally mounted a bevel gear 25 meshing with a similar gear 26 keyed to a vertical shaft 23, this shaft 23 and the gearing related therewith being similar for both right and left hand mountings is given the same number assigned to its counterpart in the other mounting.

*Core driving mechanism within housings.*—As this gear is similar for both right and left hand elements of the machine only that within the right hand housing will be described, it being understood that all parts not excepted are common to both. The description starts with vertical shaft 23.

A worm 27 is keyed upon shaft 23, meshing with a worm wheel 28 keyed on counter shaft 29. Juxtaposed to worm wheel 28 and rotatably journaled on shaft 29 is a cam wheel 30. It is noted that the gearing and parts thus far described under this heading, with the exception of the cam wheel 30, are adapted to continuously rotate in both housings whenever the main drive shaft is in motion.

Engagement of cam wheel 30 with worm wheel 28, which drives it, is effective as follows, see Fig. IV. Within the side of the wheel 28, in concentric relation, are a plurality of counter-bored openings 31, adapted to engage the end of a clutch bolt 32 housed in a counter-bore 33 off-centre within cam wheel 30. Bolt 32 is provided with a suitable shoulder against which a spiral spring 34 reacts; the spring being retained within the counter-bore by a nut 35, this nut having a square opening within which the square shank of bolt 32 is slidally retained. It is noted that the spring tends to engage the bolt with the holes in the worm wheel unless prevented. The protruding square shank of bolt 32 is turned down and fashioned to form a stop surface 36, see Fig. V, this wedge-shaped undercutting is designed to register with a correspondingly shaped surface 37 on the top of a trip bolt 38. Bolt 38 is fashioned with a square upper end slidally journaled within a casing lug on the housing; below the square portion is a reduced shank 39 terminating in a flattened end adapted to be affixed to an operating lever. Within the casing 40 and encasing the shank 39 is a spiral spring 41 normally tending to push the bolt end 38 upwardly. Affixed to the end of the shank 39 is a link 42, in turn attached to a foot treadle bell crank lever 43 balanced by a spiral spring 44. See Figs. II, III and IV. The above description will make it clear that the clutch bolt 32 tends to always engage the worm 28 in a manner to non-rotatably associate the cam wheel 30 therewith. Non-enagement is automatically attained when the end 36 of bolt 32 has run onto and interlocked with the protruding end 37 of trip bolt 38 from which it can only be released by the treadle lever 43 through the gearing thus described.

Rotation of the core and chucks by either right or left drive elements is attained as follows:—Vertical drive shaft 23 is provided with a clutch 45 operated by a shifter 46 suitably journaled within either housing 2 or 3. The upper half of the clutch 45 is connected to the stem of bevel gear 47 journaled within the head of the housing; gear 47 meshes with a corresponding gear 48 non-rotatably attached to the chuck shaft 49 driving right hand chuck 50 or left hand chuck 51 respectively. Mounted on chuck 50 is the tire core 52 on which is formed the tire fabric 53. Shaft 49 is journaled within the heads of the respective housing 2 and 3. This shaft is of tubular form having a portion adapted to house the fabric arm support reciprocating spindle 62 and an enlarged counterbore within which is housed the tubular cam slide 58 for oscillating said spindle, both as hereinafter described.

*Fabric support arm reciprocating gear.*— The mechanism for manipulating the fabric support arms follows:—See Figs. II, VI, VII, IX and XII. Within the cam wheel 30 is a cam groove 54 within which runs a tracer on the end of a lever 55 fulcrumed at 56 on a lug on the housing, the upper end of the lever terminating in a yoke 57 rotatably journaled within flanges fashioned on a spool cam 58 which cam is slidably mounted on a key 59 within the counterbore of shaft 49, thus requiring that 58 rotate with 49 but being free to slide axially thereof. Within the spool 58 is cut a spiral cam slot 60, adapted to slidably house the projecting ends of a cam pin 61 fixed within the oscillating spindle 62; the spindle, thus retained within the cam 58, is locked for rotation with it but capable of an oscillatory movement with respect thereto whose magnitude is determined by the spiral cam slot 60. See Figs. II and VI.

Within the chuck is a gear wheel 63 keyed to the end of spindle 62. Meshing with this wheel are a plurality of pinions 64, journaled on pins 65 within suitable counterbored pockets in the chucks. See Figs. VII, IX and XII. These pinions 64 mesh likewise with teeth on fabric support arm racks 66 held within radial guides 67 cut in the chuck faces 50 and 51 respectively. Extending outwardly of the rack piece 66 are lugs 68 on which are fulcrumed the arms 69. The arms 69 have a counter balance portion 70 designed to create an unbalanced component tending to centrifugally throw the free end of the arm axially toward the core when the system is in revolution. The foot of the arm 69 is further provided with a tripping lug 71 having a laterally flattened face to prevent its entrance into the radial slots 85 of the slide 79 to be hereafter explained. On the free end of the arm 69 is a fabric supporting palm 72. See Fig. XIII. It will be understood that there are a plurality of these arms 69, each having its independent rack 66 actuated by independent pinions 64; the entire system being operated by the partial revolution of the gear wheel 63 as determined by the degree of angular oscillation of the spindle 62.

*Arm tripping gear.*—The mechanism for operating this device follows:—See Figs. II, VII and XII. Within the cam wheel 30, opposite the fabric arm gear regulating groove 54, is a second groove 73 within which runs a tracer on the end of a lever 74 fulcrumed at 56 on a lug on the housing. Intermediate of the ends of lever 74 is journaled a cross link 75, extending centrally through the housing and journaled at 76 to the end of a lever 77 having a forked end 78 rotatably journaled within flanges fashioned on a tubular slide 79. Lever 77 is fulcrumed on lugs 80 on the housing. Tubular slide 79 is made to slidably encase the shaft 49 being non-rotatably keyed thereon at 81 but free to slide axially under the thrust of the cam actuated levers. See Fig. VII. The end of the slide adjacent the core is finished with a shoulder 82 and slightly removed therefrom a deep flange 83 having a smooth sliding face 84 and radial slots 85 therein adapted to house the counterbalance portions 70 of the several arm members 69.

The particular relation of the slide to the arms 69 will be presently explained.

*The chuck mechanism.*—The component parts of the chucks, right and left hand, will be explained, 50 representing the right hand chuck holder and 51 the left. See Figs. VII, VIII, IX, X and XI.

Particularly describing the right hand chuck; it is noted that adjacent the gear wheel 63 is a spacer disc 86 in which the pins 65 of the pinions 64 are journaled and which further serves to separate the gear 63 from the chucking screw disc 87. This disc 87 is provided with spirally cut teeth engaging like teeth on the radially reciprocable work holders 88. Disc 87 is rotatably housed within the recessed portion of disc 86 and further retained therein by a disc clutch face member 89. A plurality of pinions 90 are in mesh with the teeth 91 in the periphery of the screw disc 87. These pinions 90 are non-rotatably mounted on suitable pins 92 journaled within 86 and 89 and having a square shank 93 on which a socket wrench may be fitted to revolve the disc. See Figs. IX and X. When pinions 90 are rotated the disc 87 is likewise caused to rotate, the spiral teeth on its face engaging those on the reciprocating work holders 88 causing them to move radially within slots 94 in the face member 89 within which the holders 88 are housed. It will be noted that the face member 89 is provided with projecting and depressed portions on its exposed surface forming clutch members adapted to register with corresponding members on the complementary face of the left hand chuck face piece 95. Through pins 96 retain parts 50, 86 and 89 in non-rotatable relation. See Fig. VII.

Particularly describing the left hand chuck; it is noted that its gearing for reciprocating the fabric support arms 69 is similar to that described for, and shown on, the section of the right hand chuck. Directly adjacent the chuck holder piece 51 is the disc clutch face member 95, this member coacts with face piece 89 as a clutch when the parts are drawn together, having, for that purpose projections and depressions on its exposed surface adapted to register with complementary portions on piece 89. The parts 51 and 95 are non-rotatably associated by through pins 97. See Fig. VIII.

*Operation of entire machine.*—In view of the exact and detailed scheme of disclosure hereinbefore made, the operation of the machine will be described briefly.

The ply of fabric is mounted on the core in any suitable manner and of such length as will completely cover the circumference. The clutches on the core rotating shafts are, of course out; also the clutch operating the cam wheel that manipulates the fabric support arms and the gear that trips them. The fabric having been laid, one of the core driving clutches, either right or left hand elements, depending upon the desired direction of rotation of the core, is thrown in. Up to this time the fabric support arms are not in use, it being noted that they are normally tripped out of operating position by the slide 79 to assume position "B" see Fig.

XII, and so remain until released by the operation of the cam wheel 30, which is manually controlled by the operator independently of the rotation of the core.

As the core rotates at the desired speed the strip of fabric, adhering only over a small area in the median plane of the core, has its outstanding and unapplied skirts thrown centrifugally outward, see especially Fig. XIV. The process of stitching or applying the fabric to the core is now in order; that is, the fabric support arms are now ready to be applied to support the fabric as the stitcher disc lays it onto the core.

To properly illustrate this operation attention is invited to the diagram shown in Fig. XII which graphically brings out this feature. The behavior of the arms 69 as regulated by the synchronized movements of the radial reciprocating gear and the arm-tripping slide during one complete revolution of the cam wheel or, stitching cycle, is shown. The figure merely shows the action of one of the arms, it being understood that all are similarly actuated in unison. The right hand chuck mechanism is illustrated as typical of both; it having been previously explained that the corresponding arms on both chucks may be simultaneously operated should stitching discs be simultaneously applied to lay fabric on both sides of the core.

In the diagram, position "B" shows the fabric arm 69 tripped by the slide 79 shown in dotted position, being the off position; it being noted that this condition of inactivity is accounted for by the inoperative state of the cam wheel 30, see Fig. IV. In this "off" position it is noted that the end 36 of clutch bolt 32 has automatically run onto the tripping bolt end 37 and disengaged itself at the predetermined relation of the cam gear that has left the slide 79 in the position mentioned to throw arm 69 into position "B". The bolt 32 must be manually released to clutch into the worm 28 by a foot lever 43 and it will engage therein when so released and cause the cam wheel to make one full revolution before automatically running into the above mentioned "off" position. During a revolution of the cam wheel the fabric arms are caused to make one complete reciprocation and the tripping slide to release and trip the arms 69 once.

At this point, starting with position "B", the operator presses the foot lever on 43 thus releasing bolt 32 which promptly engages the cam wheel in rotating relation with the constantly running worm wheel 28 and the arm manipulating mechanism is started on its cycle. The cam mechanism moving the arms 69 radially outward immediately starts functioning. At the start of this cycle the arm 69 at "B" is there held by the shoulder 82 of slide 79, shown close to the core in dotted lines; the shoulder 82 has contacted with lug 71 an arm 69 fulcruming same downwardly until the counterbalance 70 is within the slotted portions 85 of the flange 83. As the arm reciprocates outwardly and rises to "BB" the tripping lug 71 runs off the top of the shoulder 82 causing the arm to swing by centrifugal force axially toward the core assuming the position "C" which is axially fixed by contact of the lug 71 with the face 84 of the slide; the path of travel of the palm from "BB" to "C" is on the line "BB—C". It is noted that the slide has not been caused to move although the arm 69 is running rapidly outward. From "C" the arm rises to its outer limit "CC"; a parallel course to the median plane through the core 52; its line of travel being "C—CC". The parallel travel path is fixed in order that the palm 72 shall not come into contact with the core or with a layer of fabric previously laid thereon. It is noted that the path is determined by the contact of the lug 71 with the face 84 of the still unmoved slide. Having attained the outermost point "CC" the cam gear now withdraws slide 79, retracting it to the position shown in solid lines and out of contact with the lugs 71. This releases the arm 69 to swing centrifugally against the core and to form a guide and support for the stitching of the fabric. The operator now applies the stitcher roller to the fabric and the laying operation commences. As the arm 69 is now retreating radially inward under the pull of its gearing the operator follows down with his disc keeping the feed adjusted to always operate at the point of incident of the palm 72 and the core. During the downward travel of the arm on the path "CC—A" the palm is always contacting with the contour of the core under centrifugal action, thus properly supporting the fabric during the entire operation of stitching. The arm eventually reaches the low point "A", which is the end of its utility in the stitching operation; at this point the slide 79 is caused to advance by a further operation of its cam gear, to the position shown in dotted lines; the shoulder 82 contacting with the lug 71 of the lever tripping it to the off position "B". The line of swing of the palm is indicated as "A—B". At this point the cam wheel is automatically released from the driving worm by the running up of bolt 32 onto the stop 38.

If, for any reason, it is desired to continue the rotation of the core, as to further roll the applied fabric, trim the selvage, etc., this may be done without affecting the fabric arm gear which remains idle until manually released.

As previously explained, the stitching may be done on one side of the core only, the rotation being favorable to the run of the fabric weave; if this is the method followed the appropriate clutches will be manipulated, thus reversing the direction of rotation of the core, and the stitching operation, aided by the fabric arms proceeded with on the unapplied fabric on the opposite side as heretofore explained.

Having now described an efficient carcass forming machine, constructed with devices in coacting and synchronized relation with the driving gear, and capable of being operated by one of small experience in the art; what I claim as new therein and desire to secure by Letters Patent is:

1. A device of the character described, comprising a revoluble core; radially reciprocable work support members operably associated with the core, and co-extensive with the circumference thereof and means for moving them into and out of operable contact with the work.

2. A device of the character described, comprising a revoluble core; a chuck associated therewith; radially reciprocable work support members slidable within the chuck and means for moving them into and out of operable position.

3. A device of the character described, comprising a revoluble core; a chuck associated therewith; radially reciprocable work support members slidably associated with the chuck and means for associating the revolution of the chuck with the reciprocation of the work support members.

4. A device of the character described, comprising a revoluble core in non-rotatable association with a chuck; radially reciprocable members slidably associated with the chuck; and means for rotating the chuck independently of the reciprocating means for the reciprocable members.

5. A device of the character described, comprising a revoluble core demountably and non-rotatably associated with a chuck; a plurality of radially reciprocable members slidably associated with the chuck in non-rotatable relation thereto; means for rotating the chuck and means for relating the rotation thereof to the reciprocating means for operating the reciprocable members.

6. A device of the character described, comprising a revoluble core; a chuck member associated therewith; radially reciprocable members slidably mounted on the chuck; means within the chuck for reciprocating said members in synchronized relation to the revolution thereof.

7. A device of the character described, comprising a revoluble core and a chuck; radially reciprocable members slidable on the chuck; means within the chuck in operable association with the reciprocable members, whereby said members are advanced and retracted radially in synchronized relation with the revolving speed of the core and means associated with the reciprocating means adapted to render them inoperable at a pre-determined time.

8. A device of the character described, comprising a core, non-rotatably associated with a chuck; radially reciprocable guide members slidably mounted on the chuck; means for reciprocating the guide members, and synchronized means for axially displacing the guide members from the core.

9. A device of the character described, comprising a core, non-rotatably associated with a chuck; radially reciprocable guide members slidably mounted on the chuck and actuated by means within the chuck; and synchronized means for axially displacing the guide members from the core automatically when the guides have reached a predetermined position.

10. A device of the character described, comprising a core, non-rotatably associated with a chuck; radially reciprocable guide members in synchronized relation with the chuck rotating means; and means for automatically displacing the guides axially of the core at a predetermined position, said displacing means being in synchronized association with the chuck rotating and guide reciprocating means.

11. A device of the character described, comprising a core, non-rotatably associated with a chuck; radially reciprocable guide means slidably mounted on the chuck and actuated by means therein; axially movable guide displacing means in synchronized relation with the reciprocating means whereby the path of travel of the guide is automatically controlled during a part of its travel.

12. A device of the character described, comprising a core, non-rotatably associated with a chuck; radially reciprocable guide means thereon comprising a centrifugally unbalanced lever having a palm on the free end thereof and a trip on the fulcrum end; means associated with the chuck, but independently actuated, for reciprocating said guides; axially slidable means for controlling the centrifugal action of the reciprocating lever whereby the path of travel of the palm is controlled during its outward movement and axially disengaged from contact with the core at a predetermined position; and synchronized mechanism for associating the reciprocation of the lever with the axially disengaging means.

13. A device of the character described, comprising a revoluble core, non-rotatably associated with a chuck; a plurality of radially reciprocable arms slidable on the chuck; means for reciprocating the arms in synchronized relation with the chuck rotating means; an axially slidable member adapted to control the relation of the free end of the arms with relation to core, and means for disengaging the end thereof from the core and retaining same in an inoperative position.

14. A device of the character described, comprising a revoluble core; radially movable arms associated therewith, and means for disengaging said arms automatically by means in synchronized relation with the core, substantially as described.

15. A device of the character described, comprising a core, non-rotatably mounted on a chuck in halves; counterpart members associated with each half thereof, comprising radially reciprocable arms and means for disengaging the arms and rendering them inoperative, substantially as, and for the purpose set forth.

16. In combination with a stitcher mechanism, a revoluble core; a plurality of reciprocable arms radial of the core having guide and support members thereon and means associated therewith independent of the stitcher mechanism whereby the guides advance, and recede radially in cooperation with the contour of the core during the stitching operation to effectively form a guide for the stitching device.

17. In combination with a stitcher disc, having a serrated periphery, a revoluble core; radially reciprocable members associated with the core, and automatic means for radially and axially manipulating the reciprocable members whereby the rate and manner of stitching the material to the core is controlled.

18. A device of the character described, comprising a revoluble core; automatically operated work support means adapted to radially recede in juxtaposed relation with the contour of the core; means for disengaging the work support means from contact with the core; a clutch for rendering the work support means inoperative, and a main power shaft for driving the core and the work support means.

19. In combination with a stitcher element; a revoluble core; radially reciprocable work support members operably associated with the core, said members being regularly spaced in relatively close proximity circumferentially of said core, and means for simultaneously manipulating said work support members radially toward and away from the axis of the core.

20. A device of the character described, comprising a revoluble core; radially reciprocable work support members operably associated with the core in synchronized relation thereto; means for simultaneously retracting the work support means in controlled relation with the contour of the core, and means for disengaging the work support means from the core at a predetermined point and extending same in a path other than the retracting path.

21. A device of the character described, comprising substantially counterpart and separable chucks; a core on one chuck; automatically operated work support means radially reciprocable on each chuck; means for non-rotatably associating the chucks; means for selectively driving the associated chucks in either direction; and means for simultaneously or selectively causing the work support means on either associated chuck to become operative.

In testimony whereof I affix my signature.

JOSEPH D. LACROIX.